United States Patent [19]

Mauldin et al.

[11] 4,231,898

[45] Nov. 4, 1980

[54] REFORMING WITH MULTIMETALLIC CATALYSTS

[75] Inventors: Charles H. Mauldin; William C. Baird, Jr., both of Baton Rouge, La.

[73] Assignee: Exxon Research & Engineering Co., Florham Park, N.J.

[21] Appl. No.: 53,374

[22] Filed: Jun. 29, 1979

[51] Int. Cl.³ .................. C11D 7/02; C10G 35/06
[52] U.S. Cl. .................. 252/441; 252/466 PT; 252/474; 208/139
[58] Field of Search .......... 252/441, 442, 466 PT, 252/474, 439; 208/139

[56] References Cited

U.S. PATENT DOCUMENTS

| | | | |
|---|---|---|---|
| 3,535,402 | 10/1970 | Kluksdahl | 252/474 |
| 3,729,408 | 4/1973 | Carter et al. | 252/474 |
| 3,901,827 | 8/1975 | Sinfelt et al. | 252/441 |
| 3,933,622 | 1/1976 | Mitchell et al. | 252/441 |
| 4,124,491 | 11/1978 | Antos et al. | 252/441 |
| 4,149,962 | 4/1979 | Antos | 252/441 |

*Primary Examiner*—John F. Niebling
*Attorney, Agent, or Firm*—Llewellyn A. Proctor

[57] ABSTRACT

A process for the synthesis of copper-containing catalysts by preforming an inorganic oxide support, or carrier, preferably an alumina support, impregnating said support with a copper-containing halogen acid solution, neutralizing said halogen acid treated copper-containing support, and then impregnating said neutralized support with the desired hydrogenation-dehydrogenation components.

6 Claims, No Drawings

REFORMING WITH MULTIMETALLIC CATALYSTS

BACKGROUND OF THE INVENTION AND PRIOR ART

Catalytic reforming, or hydroforming, is a process well known to the petroleum refining industry for improving the octane quality of naphthas and straight run gasolines. In a typical process, a series of reactors are provided with fixed beds of catalyst which receive upflow or downflow feed, and each reactor is provided with a heater, or interstage heater, because the reactions which take place are endothermic. A naphtha feed, with hydrogen, or recycle gas, is cocurrently passed sequentially through a reheat furnace and then to the next reactor of the series. The vapor effluent from the last reactor of the series is a gas rich in hydrogen, which usually contains small amounts of normally gaseous hydrocarbons, from which hydrogen is separated from the $C_5+$ liquid product and recycled to the process to minimize coke production; coke invariably forming and depositing on the catalyst during the reaction.

Reforming catalysts are recognized as dual functional, the catalyst composite including a metal, or metals, or a compound or compounds thereof, providing a hydrogenation-dehydrogenation function and an acidic component providing an isomerization function. The platinum group metals (ruthenium, osmium, rhodium, iridium, palladium and platinum), particularly platinum, have been widely used in commercial reforming operations, these metals being composited with an inorganic oxide base, particularly alumina; and in recent years promoters such as iridium, rhenium, germanium, tin, etc., have been added, particularly to platinum, to enhance one or more of certain of the characteristics which a good reforming catalyst must possess—viz., activity, selectivity, activity maintenance and yield stability. Rhenium has been found particularly useful in providing excellent $C_5+$ liquid yields and stability. Halogen, e.g., chlorine, is generally added to provide the required acid function.

The principal reactions produced in reforming are dehydrogenation of naphthenes to produce the corresponding aromatic hydrocarbons; isomerization of n-paraffins to form branched-chain paraffins and isomerization of ring compounds, and dehydrogenation of the latter to form aromatics; dehydrocyclization of paraffins to form aromatics; and hydrocracking of high molecular weight feed constituents to form lower molecular weight, or lower boiling, constituents, the net effect of these reactions being to increase the concentration of aromatics and isomers, with consequent octane improvement of naphthas boiling within the gasoline range. Hydrogenolysis, however, a specific and severe form of hydrocracking which produces methane, can also occur; and hydrogenolysis is particularly acute in reforming with platinum-rhenium catalysts, particularly fresh or regenerated, reactivated platinum-rhenium catalysts, which are particularly hypersensitive.

During hydrogenolysis, exotherms or heat fronts are produced which pass through a catalyst bed at startup, i.e., when a new or freshly regenerated, reactivated platinum-rhenium catalyst is initially contacted with hydrocarbons at reforming temperatures. The temperature excursions or heat fronts are undesirable because the excessive heat often damages the catalyst, or causes excessive coke laydown on the catalyst with consequent catalyst deactivation and, if uncontrolled, may even lead to damage to the reactor and reactor internals. The phenomenon is troublesome in any type of reforming operation, but is particularly troublesome in cyclic reforming wherein one reactor of the series is a swing reactor which is used as a substitute for each of the other reactors so that the catalyst of each in turn can be regenerated, and reactivated. Because of the frequency with which the catalysts must be regenerated in cyclic reforming, as contrasted with other type of reforming units, hydrogenolysis greatly reduces the efficiency of the cyclic reforming process and simply cannot be tolerated.

Hydrogenolysis can be moderated by sulfiding, and consequently it is conventional to presulfide such catalysts prior to their use in reforming. Typically, the catalyst is charged into a reactor and then contacted with an admixture of hydrogen sulfide and an inert gas, e.g., nitrogen. Unfortunately, however, whereas sulfiding moderates the type of cracking which suppresses methane formation it does little to reduce the formation of other $C_2+$ hydrocarbons gases, e.g., ethane, propane, butane and the like. This type of cracking too can cause the catalysts to become rapidly overheated when exposed, in the presence of hydrogen, at normal reaction conditions to hydrocarbons, to such extent that the catalyst itself can be overheated, sintered or otherwise damaged. Moreover, in sulfiding the catalyst special care must be taken to avoid oversulfiding because platinum-rhenium catalysts pose an acute sensitivity to feed sulfur which can drastically reduce the activity and selectivity of the catalyst.

In application Ser. Nos. 029,675 and 034,596 filed Apr. 13, 1979 and Apr. 30, 1979, respectively, platinum and rhenium containing catalysts are described, these being characterized as composites of these metals with an inorganic oxide support, to which a small concentration of copper is added to improve the catalytic activity, yield and stability of the catalyst in reforming, as contrasted with platinum-rhenium catalysts otherwise similar except that they do not contain copper. These benefits are obtained because of the ability of the copper to suppress undesirable metal promoted hydrogenolysis reactions. These benefits are particularly manifest by the addition of copper and sulfur to the catalyst, and catalysts containing both these elements are superior to their copper and sulfur-free analogs. These effects have been noted by the incorporation of these elements into a variety of reforming catalysts which contain metals, or composites of metals such as platinum, platinum-rhenium, platinum-iridium, platinum-selenium, palladium-rhenium-platinum, and palladium-platinum.

Whereas these catalysts have provided admirable improvements in catalyst activity, yield and stability, some species for no apparent reason fail to provide optimum performance. Consistency in the preparation of catalysts of given species to provide optimum benefits is, of course, highly desirable.

It is accordingly a primary objective of the present invention to obviate this and other prior art deficiencies by providing a new and improved process for the preparation of such catalysts for use in upgrading naphthas by reforming to produce higher octane gasolines.

Another object is to provide a new and improved process for the production of catalysts which, when used at suitable reforming conditions, produce high octane gasolines while minimizing hydrogenolysis and other type of hydrocracking which tend to produce methane and hydrocarbon gases of higher molecular weight than methane, especially when employing rhenium-containing catalysts, notably platinum-rhenium catalysts.

These objects and others are achieved in accordance with the present invention embodying a process for the synthesis of copper-containing catalysts by preforming an inorganic oxide support, or carrier, preferably an alumina support, impregnating said support with a copper-containing halogen acid solution, neutralizing said halogen acid treated copper-containing support, and then impregnating said neutralized support with the desired hydrogenation-dehydrogenation components.

Surprisingly, it has been found that the sequence and the manner in which the metals are added to the support in the formation of such catalysts are critical. It is essential for best results that the copper be added initially to the preformed support by impregnation with a copper-containing halogen acid solution, preferably a hydrochloric acid solution. Thereafter the copper impregnated support is neutralized with a weakly basic solution, preferably with an ammonium hydroxide solution. Suitably, the neutralized copper-containing support is then impregnated with the desired hydrogenation-dehydrogenation components, either by simultaneous addition to a single solution or by sequential impregnation from several solutions to which different metals have been added. The catalyst so produced is far superior, and consistently superior, to simultaneous impregnation of the support with the sum-total of the metals, inclusive of copper; or impregnation of the copper from an aqueous solution, with subsequent impregnation of the other metals. In accordance with the preferred impregnation proceedure the copper is uniformly distributed throughout the catalyst.

The preferred catalyst is one which contains a platinum component, generally in concentration ranging from about 0.1 percent to about 2 percent, preferably from about 0.2 percent to about 0.6 percent, based on the weight of the catalyst (dry basis). The preferred catalyst also contains rhenium, generally in concentration ranging from about 0.1 percent to about 2 percent, preferably from about 0.2 percent to about 0.6 percent, based on the weight of the catalyst (dry basis). Preferably, the platinum and rhenium are employed in weight ratios of platinum:rhenium ranging from about 0.25:1 to about 3:1, more preferably from about 0.75:1 to about 1.25:1; and most preferably is employed in substantially equal weight ratios when the total content of these metals ranges from about 0.4 percent to about 1 percent, based on the total weight of the catalyst (dry basis). The halogen content of the catalyst generally ranges from about 0.1 to about 2.5 percent, preferably from about 0.7 to about 1.2 percent, based on the weight of the catalyst (dry basis).

Copper is an essential component, the copper being added to the support in small and critical concentrations by impregnation from a halogen acid solution. Suitably, a sufficient amount of a copper-containing compound is impregnated into the support to incorporate from about 0.01 to about 0.1 percent copper, preferably from about 0.025 to about 0.08 percent copper, based on the weight of the catalyst (dry basis). A preferred catalyst is one which, besides copper, contains platinum and rhenium in specified concentrations. The copper is composited in amount sufficient to provide a molar ratio of copper:(platinum plus rhenium) ranging from about 0.02:1 at about 0.25:1, preferably from about 0.04:1 to about 0.20:1. The exact concentration of the copper depends to some extent on the nature of the feedstock and reforming conditions, but it is important that the concentration of copper on the catalyst be controlled to the proper level. High concentration of copper acts as a poison and depresses catalyst activity.

While the catalyst may be used directly, it is preferred that it be sulfided to achieve the ultimate suppression of hydrocracking during reforming. Sulfur eliminates principally the formation of excessive methane, and copper eliminates principally the formation of the $C_2^+$ hydrocarbon gases. Together, however, a given amount of both copper and sulfur prove superior in the suppression of total hydrocracking than a corresponding amount of either copper or sulfur employed individually. The sulfur content of the catalyst generally ranges to about 0.2 percent, preferably from about 0.05 percent to about 0.1 percent, based on the weight of the catalyst (dry basis). The sulfur can be added to the catalyst by conventional methods, suitably by breakthrough sulfiding of a bed of the catalyst with a sulfur-containing gaseous stream, e.g., hydrogen sulfide in hydrogen, performed at temperatures ranging from about 350° F. to about 1050° F. at pressures ranging about 1–40 atmospheres for the time necessary to achieve breakthrough, or the desired sulfur level.

The several components of the catalyst are composited with a refractory inorganic oxide support material, particularly alumina. First, the copper is added to the support, by impregnation from a halogen acid solution. The copper is deposited on a previously pilled, pelleted, beaded, extruded, sieved or powdered particulate support material by impregnation with a halogen acid solution within which a compound of copper is dissolved. Generally, the porous refractory inorganic oxide, in dry or solvated state, is contacted, with the copper-containing solution and thereby impregnated by absorption from a dilute or concentrated solution with subsequent filtration or evaporation to effect total uptake of the copper component. The copper is contained in the solution in any of the common inorganic or organic salts of this element. These includes halides, nitrates, nitrites, sulfates, sulfites, carbonates, hydroxides, bicarbonates or carboxylates. Preferred salts are fluoride, chloride, nitrate, nitrite, hydroxide and oxide. The more preferred salts are copper (II) fluoride, copper (I) chloride, copper (II) chloride, and copper (II) nitrate due to their availability, low cost, and ready solubility in aqueous media.

While these copper salts may be impregnated onto alumina from aqueous solutions, optimum copper distribution requires the use of hydrochloric acid solutions as the impregnation medium. It is believed that the presence of hydrochloric acid permits the formation of copper chloride complexes that converts cationic copper to an anionic state, which is more readily absorbed and distributed by the alumina. The well known chloro complexes, $CuCl_2^-$, $CuCl_3^=$, $CuCl_3^-$, $CuCl_4^=$, are examples of the copper species best known for effective copper distribution. The concentration of copper in the impregnating solution is not critical and is determined by the copper content desired in the finished catalyst.

The calcined alumina extrudates are soaked in a copper salt solution in hydrochloric acid for a desired period. The strength of the hydrochloric acid may range from about 0.1–11.7 N; 1–5 N being preferred; and, 1 N being most preferred. The soaking period may range from 1–24 hr.; 10–20 hr. being preferred. Generally, ambient conditions are employed.

Exposing the alumina to hydrochloric acid introduces high levels of chloride into the alumina base. This high chloride content inhibits subsequent metals impregnation, and the finished catalyst gives high acid cracking in naphtha reforming. Chloride is effectively removed from the acid treated alumina by neutralization, preferably with ammonium hydroxide by soaking at ambient conditions for the desired time. The strength of the ammonium hydroxide solution ranges from 0.1–15 N; a range of 0.1–5 N is preferred; 0.5–1.0 N is most preferred. The soaking period ranges from 5–60 min.; 60 min. is preferred. Other inorganic bases are not preferred due to contamination of the alumina by the accompanying metal ions, which depress the activity of the finished catalyst. Aqueous solutions of organic amines and quaternary ammonium bases are not desired due to the prospect for nitrogen poisoning of the alumina and removal of copper through amine complexes. Ammonium hydroxide is most preferred on the basis of cost, effectiveness, and ease of removal by washing with water or thermal treatment.

Impregnation of the remaining metals is accomplished by conventional means. Both the incipient wetness technique and soaking in an excess of the impregnation medium are acceptable. The impregnation of the platinum and rhenium components into a carrier is carried out by impregnating the carrier with a solution, or solutions, of the respective salts or compounds of the elements or metals to be incorporated. Salts, acids or compounds of each metal can be dissolved in a solution, or the salts, acids or compounds can be separately dissolved in solutions, the solutions admixed, and the admixed solution used for impregnation of the carrier. In other words, copper is added initially using conventional techniques, and then the other metals are added simultaneously or sequentially, suitably by impregnation. The amount of impregnation solution used should be sufficient to completely immerse the carrier, usually within the range from about 1 to 20 times of the carrier by volume, depending on the metal concentration in the impregnation solution. The impregnation treatment can be carried out under a wide range of conditions including ambient or elevated temperatures and atmospheric or supratmospheric pressures.

In a preferred embodiment of the present invention a carrier, or support, is impregnated with an aqueous halogen-acid solution of the copper, preferably a hydrochloric acid solution containing the copper. Exposure to a halogen acid can introduce substantially high levels of halogen into the carrier which is not desirable because subsequent metal impregnation is inhibited, and the catalyst can produce high acid cracking in reforming. However, excess halogen can be readily removed from the acid treated carrier by neutralization, preferably with ammonium hydroxide, suitably by contact at ambient temperature for periods ranging about 0.1 to about 1 hour, at strengths ranging from about 0.1 N to about 15 N, preferably from about 0.1 N to about 5 N. These treatments are followed by evaporation or filtration and then drying or calcination, or both, and then the copper impregnated catalyst can be further impregnated with a solution containing a dissolved salt or compound of platinum and rhenium, or platinum, rhenium and additional metals, followed by evaporation or filtration, with subsequent drying or calcination, or both, whereby the components are dispersed substantially uniformly to the inner part of the catalyst.

As suggested, a halogen component is also required. Fluorine and chlorine are preferred halogen components. The halogen is contained on the catalyst in concentration ranging from about 0.1 percent up to about 2.5 percent, preferably within the range of about 0.7 to about 1 percent, based on the weight of the catalyst. The introduction of halogen into catalyst can be carried out by any method and at any time of the catalyst preparation, for example, prior to, following or simultaneously with the impregnation of the copper, platinum and rhenium components. In the usual operation, the halogen component is introduced simultaneously with the incorporation of these metal components. It can also be introduced by contacting a carrier material in a vapor phase or liquid phase with a halogen compound such as hydrogen fluoride, hydrogen chloride, ammonium chloride, or the like.

The support can contain, for example, one or more of alumina, bentonite, clay, diatomaceous earth, zeolite, silica, activated carbon, magnesia, zirconia, thoria, and the like; though the most preferred support is alumina to which, if desired, can be added a suitable amount of other refractory carrier materials such as silica, zirconia, magnesia, titania, etc., usually in a range of about 1 to 20 percent, based on the weight of the support. A preferred support for the practice of the present invention is one having a surface area of more than 50 m$^2$/g., preferably from about 100 to about 300 m$^2$/g., a bulk density of about 0.3 to 1.0 g/ml, preferably about 0.4 to 0.8 g/ml, an average pore volume of about 0.2 to 1.1 ml/g., preferably about 0.3 to 0.8 ml/g., and an average pore diameter of about 30 to 300 Å.

The catalyst, after impregnation, is dried by heating at a temperature above about 80° F., preferably between about 150° F. and 300° F., in the presence of nitrogen or oxygen, or both, in an air stream or under vacuum. The catalyst is calcined at a temperature between about 500° F. to 1200° F., preferably about 500° F. to 1000° F., either in the presence of oxygen in an air stream or in the presence of an inert gas such as $N_2$.

The catalyst can be activated by contact with air at temperatures ranging from about 500° F. to about 1050° F. for periods ranging from about 1 to about 24 hours in either flowing or static air. Reduction is performed by contact with flowing hydrogen at temperatures ranging from about 350° F. to about 1050° F. for periods ranging from about 0.5 to about 24 hours at about 1–40 atm. The catalyst can be sulfided by use of a blend of $H_2S/H_2$ and performed at temperatures ranging from about 350° F. to about 1050° F. at about 1–40 atm. for a time necessary to achieve breakthrough, or the desired sulfur level. Post-sulfiding stripping can be employed if desired at conditions similar to those for reduction of the catalyst.

Treatment of the catalyst with mixture of chlorine and oxygen can be substituted for air activation if desired. This procedure can correct for any possible maldispersion of the metals arising from improper impregnation, and the procedure is useful in restoring activity during regeneration-rejuvenation after on oil service. A blend of chlorine, oxygen and nitrogen can also be employed at temperatures ranging from about 350° F. to about 1050° F. for periods ranging from about 1 to about 24 hours at 1–40 atm. Treat times for these various operations is a function of gas flow rates, gas compositions, and conditions. The catalyst halide content can be controlled during impregnation, or adjusted by treatment with water or water-hydrogen chloride blends.

This catalyst can be used in semi-regenerative, cyclic, semi-cyclic, or continuous bed reforming. The catalyst is particularly useful at severe reforming conditions, especially at low pressures, or pressures ranging from about 50 psig to about 150 psig, where maximum yield is favored.

The feed or charge stock can be a virgin naphtha, cracked naphtha, a Fischer-Tropsch naphtha, or the like. Typical feeds are those hydrocarbons containing from about 5 to 12 carbon atoms, or more preferably from about 6 to about 9 carbon atoms. Naphthas, or petroleum fractions boiling within the range of from about 80° F. to about 450° F., and preferably from about 125° F. to about 375° F., contain hydrocarbons of carbon numbers within these ranges. Typical fractions thus usually contain from about 20 to about 80 Vol.% paraffins, both normal and branched, which fall in the range of about $C_5$ to $C_{12}$, from about 10 to 80 Vol.% of naphthenes falling within the range of from about $C_6$ to $C_{12}$, and from 5 through 20 Vol.% of the desirable aromatics falling within the range of from about $C_6$ to $C_{12}$.

The reforming runs are initiated by adjusting the hydrogen and feed rates, and the temperature and pressure to operating conditions. The run is continued at optimum reforming conditions by adjustment of the major process variables, within the ranges described below:

| Major Operating Variables | Typical Process Conditions | Preferred Process Conditions |
|---|---|---|
| Pressure, Psig | 50-750 | 100-300 |
| Reactor Temp., °F. | 750-1100 | 850-1000 |
| Gas Rate, SCF/B (Incl. Recycle Gas) | 1500-10,000 | 2000-7000 |
| Feed Rate, W/W/Hr | 0.5-10 | 1-3 |

The invention will be more fully understood by reference to the following demonstrations and examples which present comparative data illustrating its more salient features. All parts are given in terms of weight except as otherwise specified.

EXAMPLES

A series of catalysts were prepared from commercially supplied 1/16" high purity gamma alumina extrudates calcined in air at 1000° F. for 4 hours.

Catalyst A

Into a large fritted glass funnel was placed 150 ml. of water. To the water was added 98 g. of alumina extrudates. The following stock solutions were added to the mixture: 12.0 ml of $H_2PtCl_6$ solution (25 mg Pt/ml); 20 ml $H_2IrCl_6$ solution (16.6 mg Ir/ml), 2.0 ml CuCl solution (50 mg Cu/ml); 10 ml HCl solution (60 mg Cl/ml). The catalyst was recovered by filtration, dried in air, and finally dried in a vacuum oven at 130° C. for 3 hrs. The catalyst was crushed to 14-35 mesh particles, and a sample was charged to a quartz pretreat reactor. The catalyst was treated with the following gases at 500° C. and 600 cc/min; $H_2$, 1 hr.; 0.2% $H_2S$ in $H_2$, 7 min; $H_2$, 2 hrs. The composition of the catalysts is given in Table I.

Catalyst B

To a solution of 4.0 ml of copper (I) chloride stock solution (50 mg Cu/ml) and 37.5 ml of concentrated hydrochloric acid diluted with water to 450 ml was added 291 g. of alumina extrudates. After 16 hrs. the extrudates were recovered by filtration and washed with two liters of water. The extrudates were added to 500 ml of ammonium hydroxide solution containing 33 ml of concentrated $NH_4OH$. After one hr. the extrudates were collected by filtration and washed with eight liters of water. The extrudates were added to 450 ml of water. The following stock solutions were added: 36 ml $H_2PtCl_6$ (25 mg Pt/ml); 54.2 ml $H_2IrCl_6$ (16.6 mg Ir/ml); 3.3 ml HCl (60 mg Cl/ml). The catalyst was recovered, dried, and pretreated as described for Catalyst A. The composition of the catalyst is given in Table I.

Catalyst C

To a solution of 15 ml of copper (I) chloride stock (50 mg Cl/ml) and 48 ml of concentrated hydrochloric acid diluted to 450 ml with water was added 300 g. of alumina extrudates. After 16 hrs. the alumina was recovered, washed with water, and dried. One hundred grams of the copper-alumina was added to 150 ml of water. Stock solutions of $H_2PtCl_6$ and $HReO_4$ were added. The catalyst was recovered and dried in a vacuum oven. A sample was pretreated in a quartz reactor as described for Catalyst A. Catalyst C was air activated in a muffle furnace at 750° F. for 3 hrs. prior to being charged to the quartz reactor. The composition of the catlayst is given in Table I.

Catalyst D

A Pt-Re-Cu catalyst was prepared by the procedure outlined for Catalyst B. The composition of the catalyst is given in Table I.

Catalyst E

A Pt-Cu catalyst was prepared by the procedure used for Catalyst C. The composition of the catalyst is given in Table I.

Catalyst F

A Pt-Cu catalyst was prepared by the procedure of Catalyst B. The composition of the catalyst is given in Table I.

Catalyst G

A Pd-Re-Pt-Cu catalyst was prepared by the procedure of Catalyst A. The composition of the catalyst is given in Table I.

Catalyst H

A Pd-Re-Pt-Cu catalyst was prepared by the procedure of Catalyst B. The catalyst was air activated at 750° F. for 3 hrs. prior to pretreatment. The composition of the catalyst is given in Table I.

Catalyst I

A Pd-Pt-Cu catalyst was prepared by the procedure of Catalyst C. The composition of the catalyst is given in Table I. The sulfiding step was eliminated.

Catalyst J

A Pd-Pt-Cu catalyst was prepared by the procedure of Catalyst B. The composition of the catalyst is given in Table I. The sulfiding step was eliminated.

Catalyst A-F were examined for metals distribution by electron probe microscopy. In all cases uniform copper distribution results when the procedure of this invention was used to prepare the catalyst.

TABLE I

| Components | Cat A | Cat B | Cat C | Cat D | Cat E | Cat F | Cat G | Cat H | Cat I | Cat J |
|---|---|---|---|---|---|---|---|---|---|---|
| Platinum | 0.26 | 0.29 | 0.22 | 0.32 | 0.21 | 0.32 | 0.10 | 0.10 | 0.063 | 0.097 |
| Iridium | 0.35 | 0.33 | — | — | — | — | — | — | — | — |
| Rhenium | — | — | 0.19 | 0.23 | — | — | 0.23 | 0.27 | — | — |
| Palladium | — | — | — | — | — | — | 0.31 | 0.30 | 0.25 | 0.28 |
| Copper | 0.068 | 0.049 | 0.10 | 0.53 | 0.10 | 0.026 | 0.054 | 0.10 | 1.0 | 0.042 |
| Chlorine | 1.36 | 0.99 | 1.35 | 0.90 | 2.39 | 0.91 | 1.07 | 0.71 | 1.45 | 0.94 |
| Sulfur | 0.036 | 0.081 | 0.053 | 0.077 | — | — | 0.093 | 0.12 | — | — |

Catalysts A, B, C, and D were each then contacted at reforming conditions in separate runs with heptane with the results given in Table II.

TABLE II

Heptane Reforming
500° C., 100 psig, H$_2$/heptane = 5

| Catalyst | W/H/W | Yield, Wt. % | |
|---|---|---|---|
| | | C$_5$ | Toluene |
| A (Pt-Ir-Cu) | 10 | 84.0 | 17.0 |
| B (Pt-Ir-Cu) | 20 | 89.2 | 26.7 |
| C (Pt-Re-Cu) | 10 | 64.0 | 24.1 |
| D (Pt-Re-Cu) | 10 | 81.7 | 24.0 |

Catalysts B and D prepared by the procedure of this invention are clearly superior catalysts.

Catalyst E and F were evaluated in heptane reforming, and the results are given in Table III.

TABLE III

Heptane Reforming
500° C., 1 atm., 2.5 W/H/W, H$_2$/heptane = 37

| Catalyst | Conversion, % | Aromatic Selectivity % | Aromatic Yield, % |
|---|---|---|---|
| E | 74.0 | 72.2 | 53.4 |
| F | 88.1 | 69.7 | 61.4 |

Catalyst F prepared by the procedure of this invention is superior in activity and yield.

In further tests, Catalysts G and H were used to reform a petroleum naphtha the inspections of which appear in Table IV. Catalyst H shows activity and yield advantages for reforming naphtha, as shown by reference to Table V.

TABLE IV

| ASTM Distillation, °F. | |
|---|---|
| Initial | 145 |
| 10 | 181 |
| 20 | 204 |
| 30 | 222 |
| 40 | 240 |
| 50 | 258 |
| 60 | 275 |
| 70 | 293 |
| 80 | 313 |
| 90 | 334 |
| Final B.P. | 363 |
| Octane No. RON Clear | 34.8 |
| Gravity, °API | 59.7 |
| Sulfur, Wt. ppm | <0.1 |
| Water, Wt. ppm | <10 |
| Chloride, Wt. ppm | <0.1 |
| Analysis, Vol. Percent | |
| Paraffins | 69.4 |

TABLE IV-continued

| ASTM Distillation, °F. | |
|---|---|
| Naphthenes | 16.7 |
| Aromatics | 13.9 |

TABLE V

Reforming of Low Sulfur Fos Paraffinic Feed
930° F., 2000 psig, 5000 SCF/B, 1.4 W/H/W

| Catalyst | Relative Activity (400 hr.) | C$_5$+ LV % at 100 RON (400 hr.) |
|---|---|---|
| G | 1.0 | 68.8 |
| H | 1.3 | 72.4 |

Catalysts I and J were evaluated in heptane reforming, with the results given in Table VI.

TABLE VI

Heptane Reforming
500° C., 1 atm. 2.5 W/H/W, H$_2$/heptane = 37

| Catalyst | Conversion, % | Aromatic Selectivity, % | Aromatic Yield, % |
|---|---|---|---|
| I | 48.4 | 70.2 | 34.0 |
| J | 88.0 | 77.3 | 68.0 |

It is apparent that various modifications and changes can be made without departing from the spirit and scope of the present invention.

Having described the invention, what is claimed is:

1. A process for the preparation of copper-containing catalysts which comprises
    forming an inorganic oxide support,
    impregnating said support by contact thereof with a copper-containing halogen acid solution,
    neutralizing said halogen acid treated, copper-containing support, and then
    impregnating said copper-containing support by contact thereof with a solution containing one or more hydrogenation-dehydrogenation components.

2. The process of claim 1 wherein the inorganic oxide support is alumina.

3. The process of claim 1 wherein the halogen acid is hydrogen chloride.

4. The process of claim 1 wherein the halogen acid treated copper-containing support is neutralized with ammonium hydroxide.

5. The process of claim 1 wherein the hydrogenation-dehydrogenation components are comprised of Group VIII noble metals and Group VII-B metals.

6. The process of claim 1 wherein the inorganic oxide support is alumina, the halogen acid is hydrogen chloride, the halogen acid treated copper-containing support is neutralized with ammonium hydroxide, and the Group VIII noble metals are platinum, palladium and iridium and the Group VII-B metal is rhenium.

* * * * *